United States Patent
Arcese et al.

(10) Patent No.: US 9,710,135 B2
(45) Date of Patent: Jul. 18, 2017

(54) APPLICATION SWITCHING IN A GRAPHICAL OPERATING SYSTEM

(71) Applicant: International Business Machines Corporation, Armonk, NY (US)

(72) Inventors: Mauro Arcese, Rome (IT); Luca Gimondo, Rome (IT); Marco Imperia, Rome (IT); Stefano Manocchio, Rome (IT)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 13/625,133

(22) Filed: Sep. 24, 2012

(65) Prior Publication Data
US 2013/0104144 A1   Apr. 25, 2013

(30) Foreign Application Priority Data

Oct. 19, 2011   (EP) ..................... 11185713

(51) Int. Cl.
G06F 9/46        (2006.01)
G06F 3/0484      (2013.01)

(52) U.S. Cl.
CPC ................. *G06F 3/0484* (2013.01)

(58) Field of Classification Search
None
See application file for complete search history.

(56) References Cited

U.S. PATENT DOCUMENTS

| 6,781,611 B1 | 8/2004 | Richard |
| 6,831,666 B1 | 12/2004 | Kreis |
| 7,346,855 B2 | 3/2008 | Hellyar et al. |
| 7,478,326 B2 | 1/2009 | Holecek et al. |
| 7,596,760 B2 | 9/2009 | Sauve et al. |
| 7,941,761 B2 | 5/2011 | Hally et al. |
| 8,209,376 B1 * | 6/2012 | Stochosky ............... 709/203 |

(Continued)

FOREIGN PATENT DOCUMENTS

| CN | 101778166 | 7/2010 |
| CN | 102207825 A | 10/2011 |
| WO | WO2013057602 A1 | 4/2013 |

OTHER PUBLICATIONS

Microsoft; Microsoft Computer Dictionary; Mar. 15, 2002; Microsoft Press.*

(Continued)

*Primary Examiner* — Dong Kim
(74) *Attorney, Agent, or Firm* — Yee & Associates, P.C.; Richard A. Wilhelm (57) ABSTRACT

A method for application switching in an operating system may be provided. The method may comprise providing at least two active applications on the operating system, and providing a first list of actions related to the first active application, via a first interface, to an application switching manager, and providing a second list of actions related to the second active application, via a second interface, to the application switching manager. Additionally, the method may further comprise selecting an active application out of the at least two active applications together with selecting an action selected from the first list of actions for a first application or a second action for the second list for a second application using a graphical user interface.

3 Claims, 5 Drawing Sheets

(56) References Cited

U.S. PATENT DOCUMENTS

| | | | |
|---|---|---|---|
| 8,245,154 B2 | 8/2012 | Karstens | |
| 8,417,357 B2 | 4/2013 | Husoy et al. | |
| 2002/0085042 A1* | 7/2002 | Matthews et al. | 345/810 |
| 2005/0246654 A1 | 11/2005 | Hally et al. | |
| 2006/0161847 A1 | 7/2006 | Holecek et al. | |
| 2006/0230356 A1 | 10/2006 | Sauve et al. | |
| 2008/0098307 A1 | 4/2008 | Corbefin | |
| 2008/0109753 A1 | 5/2008 | Karstens | |
| 2008/0155477 A1 | 6/2008 | Bocking | |
| 2009/0027334 A1 | 1/2009 | Foulk et al. | |
| 2009/0158212 A1* | 6/2009 | Dykstra-Erickson et al. | 715/811 |
| 2009/0187840 A1* | 7/2009 | Moosavi | 715/767 |
| 2009/0193364 A1* | 7/2009 | Jarrett et al. | 715/838 |
| 2010/0114337 A1 | 5/2010 | Husoy et al. | |
| 2010/0313169 A1* | 12/2010 | Huang et al. | 715/835 |
| 2011/0041177 A1* | 2/2011 | Pereira | 726/20 |
| 2012/0216146 A1* | 8/2012 | Korkonen | 715/835 |

OTHER PUBLICATIONS

PCT search report dated Jan. 10, 2013 regarding application PCT/IB2012/054408, filed Aug. 12, 2012, reference DE920110061, applicant International Business Machines Corporation, 9 pages.

"Atl + Tab", Wikipedia, Retrieved from internet on Sep. 26, 2012, Last Modified on Sep. 17, 2012, 8 pages http://en.wikipedia.org/w/index.php?title=Alt-Tab&oldid=513281685.

Zhang et al., "COM Interface Hooking and Its Application—Part I", Retrieved from Internet on Sep. 24, 2012, Published on Oct. 19, 2003, 13 pages http://www.codeproject.com/kb/com/cominterfacehookingpart.aspx.

"Inter-Process Communication", Wikipedia, Retrieved from internet on Sep. 24, 2012, Last Modified on Sep. 6, 2012, 3 pages http://en.wikipedia.org/wiki/Interprocess_communication.

Curtiss, "How the Scroll Wheel Should Work in Windows", Retrieved from internet on Feb. 10, 2011, Published in Nov. 2009, 5 pages http://www.htmlcenter.com/blog/how-the-scroll-wheel-should-work-in-windows/.

"The Brand New Alt-Tab Task Switcher", Retrieved from internet on Feb. 10, 2011, VistaSwitcher, Version: 1.1.4, Nov. 24, 2010, 2 pages http://www.ntwind.com/software/vistaswitcher/new-alt-tab.html.

Examination Report, dated Mar. 27, 2014, regarding Application No. GB1403238.7, 6 pages.

"Jump Lists; Applies to Windows 7," Microsoft, copyright 2014, 1 page. Accessed Mar. 27, 2014, http://windows.microsoft.com/en-GB/windows7/products/features/jump-lists.

Nordell, "Making Outlook Work for You: Outlook Jump List," Oct. 3, 2011, 2 pages. Accessed Mar. 27, 2013, http://makingoutlookworkforyou.blogspot.co.uk/2011/10/outlook-jump-list.html.

* cited by examiner

| 402 providing unit for providing applications |

| 404 1st interface unit for providing first list of actions of the first applications to an application switch manager |

| 406 2nd interface unit for providing second list of actions of the second to the application switch manager |

| 408 selecting unit for selecting an application together with an action |

APPLICATION SWITCHING IN A GRAPHICAL OPERATING SYSTEM

CROSS-REFERENCE TO RELATED APPLICATION(S)

This application claims the benefit of priority to European Patent Application No. 11185713.2, filed on Oct. 19, 2011, the contents of which are hereby incorporated by reference.

FIELD OF THE INVENTION

The invention relates generally to a method for application switching in an operating system and an application switching unit.

The invention relates further to an operating system, a computer system, a data processing program, and a computer program product.

BACKGROUND OF THE INVENTION

Modern computers may make use of operating systems with a graphical user interface. Such operating systems may allow users to execute multiple applications in parallel. One or more applications may be active at the same time. However, typically, only one of the multiple active applications may be actively executed in one active window of the graphical user interface of the operating system. On personal computers, the programs may comprise a wide variety of different applications like word processors, spread sheet programs, transactional database applications, browsers or other access mechanisms for a communication with the Internet, or any other application.

When working with the computer, a user may wish to switch from one application to another application. Typical desktop operating systems, e.g., the Windows operating system from Microsoft, may allow switching between active applications in an active window by pressing the TAB-key while having the Alt-key depressed. Each additional activation of the TAB-key switches from one active application to a next active application in a round robin fashion. A graphical representation of the different active applications in form of an icon for each application may be displayed to a user such that the user may recognize the different applications between which he may choose.

In some cases, an application may allow, e.g., to work on different files. A typical example may be working on different text files using a word processor. In such a case, different text files may be opened in different windows all relating to the same application. In such a case, the conventional technique may allow to switch to a specific open file using the word processor.

Several attempts have been made to enhance the usability of such application switching or application selection processes. Document U.S. Pat. No. 6,781,611 B1 discloses a method and system for navigating between applications, documents, and files. A user may easily switch between multiple open windows and multiple applications on a computer desktop. A visual indicator is provided on an application button. The indicator is linked to a list of open windows within an application presented by the application button. By interacting with the visual indicator, a desired selection from the list of open windows can be surfaced. The visual indicator may comprise an arrow positioned within the application button. Interaction with the visual indicator may comprise positioning a pointer of a pointing device over the visual indicator on the application button. A user then clicks and holds on the visual indicator with the pointing device. A pop-up menu is surfaced containing the list of open windows within the application represented by the application button.

Such a user interface may allow a user—beyond switching between applications—to select one of the open windows that have previously been opened as part of an interaction with the related application. It may not allow opening a new window or start an execution of a new function that may not have been activated before within the application.

Thus, there may be a need for an improved method of interacting and selecting active applications in a user interface of an operating system comprising a graphical user interface.

SUMMARY OF THE INVENTION

This need may be addressed by a method for application switching in an operating system, an application switching unit, a computer system, an operating system, a data processing program, and a computer program product according to the independent claims.

In one embodiment, a method for application switching in an operating system may be provided. The method may comprise providing at least two active applications on the operating system, and providing a first list of actions related to the first active application, via a first interface, to an application switching manager, and providing a second list of actions related to the second active application, via a second interface, to the application switching manager. Additionally, the method may further comprise selecting an active application out of the at least two active applications together with selecting an action selected from the first list of actions for a first application or a second action for the second list for a second application using a graphical user interface.

In another embodiment, an application switching unit for an operating system may be provided. The application switching unit may comprise a providing unit adapted for providing at least two active applications on the operating system. Furthermore, the method may comprise a first interface unit adapted for providing a first list of actions related to the first application to an application switching manager, and a second interface unit adapted for providing a second list of actions related to the second active application to the application switching manager. Furthermore, the application switching unit may comprise a selection unit adapted for selecting an active application out of the at least two active applications together with selecting an action selected from the first list of actions for the first application or a second action from the second list of actions for the second application using a graphical user interface.

It may be noted that the application switching manager may in particular be a component of the operating system.

DETAILED DESCRIPTION

A skilled person will understand that the above-mentioned method may be compatible with any kind of windows based operating system, such as, Microsoft Windows, Linux with a graphical user interface, the upcoming chrome OS, but also operating systems of Smartphones like Android, iOS, Symbian, and any other operating systems for desktop or mobile devices using graphical user interfaces.

In order to allow the application switching manager to access different actions relating to an active application, the related application may need to be modified. A required modification may be in adding an interface to the application via which possible action related to the application may be exposed to the application switching manager.

In the context of this application the following conventions have been followed:

Application—An application may denote a computer program being executable on an operating system running on a computer. The application may be self-contained. It may also have a user interface. The user interface may actively be supported by a graphical user interface of the operating system. The application may be operated independently of other applications with the exception of the operating system and its components. It may, in particular, be compiled in one piece and components may not be executable separately and independently. However, different components of the application program may be executed on different computers being communicatively connected to each other. One example may be a transactional application having a user interface being executed on one computer while a related database system may be executed on another computer. A skilled person may also understand that other examples of standalone programs may be a word processor, a spreadsheet program, a browser, a graphical design program, an e-mail program and the like.

The term "selecting an active application" may denote a user interaction with a graphical user interface of a windows based operating system such that a user actively selects an application program he would like to interact with. As a consequence of such a selection, a related window of the graphical user interface may be positioned in the foreground of the graphical user interface such that the user may interact directly with the selected active and executed program. An application switching to the selected application may be the result.

The above-described method for application switching in an operating system may offer a couple of advantages.

In particular, it may allow a user not only to switch between different applications or between active windows of active applications, but may allow a user to actively trigger a new function when selecting an application. A simple example may be selecting a function within an e-mail program that has not been activated before when using the e-mail program. The user may have activated or started the application "e-mail program". However, he may not have activated the function writing a new e-mail. Typically, a different layout of the graphical user interface may be displayed to the user when such a function of the e-mail program may be activated.

But, in this case, it may be assumed that only the e-mail program may have been started with an overview of all possible activities a user may perform using the e-mail program.

The inventive method however, may allow a user to actively select the function "writing an e-mail" at the same time when selecting the e-mail program out of a list of other active applications. This may be the case if a user may have opened the e-mail program and then decides to start another program, e.g., a word processor. In the midst of working with the word processor, the user may require to write an e-mail. He then may switch to the e-mail program and instantly—with the same interaction of selecting the e-mail program—also selecting the function "writing an e-mail" as part of the e-mail program. This may reduce the time to switch to another application and then—only in a next step—select a specific task, in this case "writing a new e-mail". The inventive method may allow doing this in one step.

In one embodiment of the method, the selecting an active application may comprise traversing graphically in an application switching direction through graphical representation of the at least two active applications based on a "select application signal". The application switching direction may, in particular, be a horizontal direction. Graphical presentations of different active applications may be shown graphically in a user interface of the operating system allowing a switching between the different active applications. Typically, the active application to be selected may be highlighted or framed, if a pointer of a pointing device may be hovered over a related icon. Graphical representations of the different active applications may be shown horizontally side by side and may be selected in a round robin fashion. A switch from one application to another application may be performed by the TAB-key of a conventional keyboard while keeping the Alt-key depressed.

In another embodiment of the method, the selecting action may comprise traversing graphically through a graphical representation of the list of actions for an associated application of the at least two applications, wherein a respective action traversal direction is different to the application switching direction. The action traversal direction may in particular be vertical to a horizontal application switching direction. As discussed above, a switching between the applications may be performed by using the conventional Alt-tab-key-combination, while depressing up and down arrow keys in parallel to the Alt-tab-key-combination. The up and down arrows may be used to for moving to an icon for an action related to an application. Thus, a function or command within an application may immediately be executed when a switch to a selected active application may be performed. The user may not be required to select the command or function after a switching to the selected active application has been performed. Instead, the program performs the command or action immediately when switching to the selected application.

In another embodiment of the method, each action may be associated with the command executable by the respective active application or the at least two applications. Thus, the command—as part of the application—may be executed immediately after or in parallel to switching to the selected application. For a user, this process is completely transparent meaning that he may not have to perform any additional commands, making a switch between different active applications much more effective.

In again another embodiment of the method, the command may be executed immediately, in particular in real-time, after selecting the active application out of the at least two active applications together with selecting the action. Again, this may guarantee a much smoother user experience because it is not required firstly to switch to a selected application and then selecting or activating a specific command or function within the selected application. Instead, the selecting and executing of a command or function within the application may be performed in one step.

Furthermore, an operating system may be configured to execute the method according to the inventive method as explained above. Such integration into an operating system may have the advantage that the method for switching between different applications may be performed immediately as a new function of the operating system just after an installation. No new additional operating system programs may need to be installed on the computer.

It should be noted that embodiments may take the form of an entire hardware implementation, an entire software embodiment or an embodiment containing both, hardware and software elements. In a preferred embodiment, the invention may be implemented in software, which includes, but is not limited to, firmware, resident software and/or microcode.

In another embodiment, a data processing program for execution in a data processing system may be provided comprising software code portions for performing the method, as described above, when the program may be run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

BRIEF DESCRIPTION OF THE DRAWINGS

Preferred embodiments of the invention will now be described, by way of example only and with reference to the following drawings.

DETAILED DESCRIPTION OF EXEMPLARY EMBODIMENTS

In the following, a detailed description of the figures will be provided. All illustrations in the figures are schematic. Firstly, a block diagram of an embodiment of the method for application switching will be described. Afterwards, embodiments of the method and the application switching unit will be described.

Figure 1:
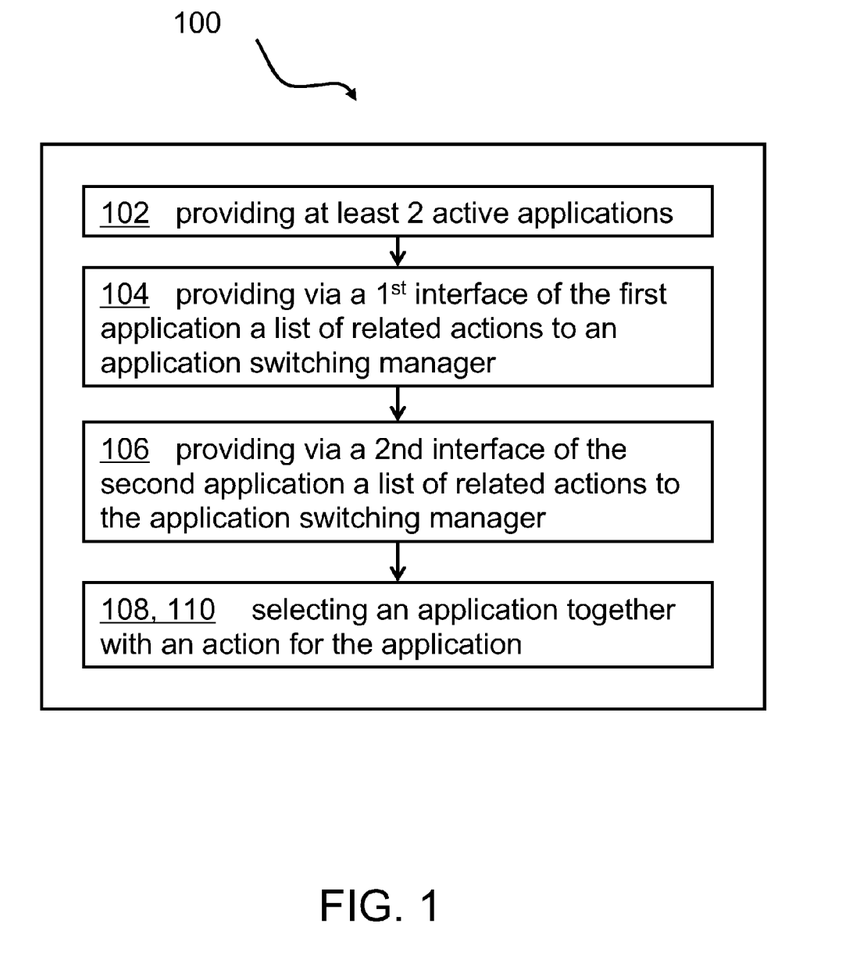
FIG. 1 shows a block diagram of an embodiment of the inventive method for application switching.

FIG. 1 shows a block diagram of an embodiment of the inventive method 100 for application switching. The method may comprise, providing, 102, at least two active applications on the operating system, and providing, 104, a first list of actions related to the first active application, via a first interface, to an application switching manager, and providing, 106, a second list of actions related to the second active application, via a second interface, to the application switching manager. Furthermore, the method may comprise selecting, 108, an active application out of the at least two active applications together with selecting, 110, an action selected from the first list of actions for the first application, or a second action from the second list of actions for the second application, using a graphical user interface.

It may be understood that the providing of a first list of actions via a first interface may require a modification or adaption of the related application prior to using the application switching method. This may mean that provision may be made for providing such list via such interface during the programming phase of the application. Otherwise, the selectable action may not be made available via the interface to the application switching manager. However, in this case the application switching may work in the conventional way without selecting an action, respectively a command to be executed on switching from one application to the other. Thus, the new method may be compatible with existing technology in that the new method may only work with modified applications conforming to the required interface.

Figure 2:
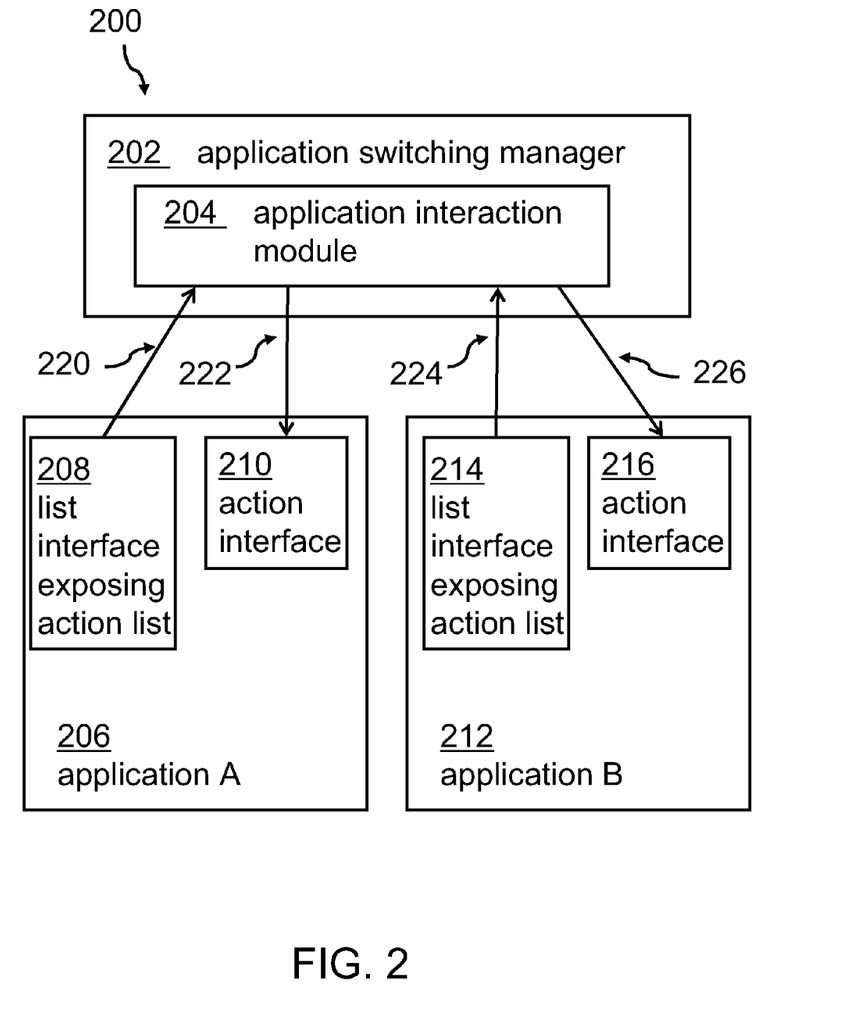
FIG. 2 shows a block diagram of an application switching manager together with related active applications.

FIG. 2 shows a block diagram 200 of an application switching manager 202 together with related active applications 206, 212. The application switching manager 202 may comprise an application interaction module 204. This application interaction module may be adapted to interact via an interface with a list interface 208 for exposing an action list of application A, 206 to the application interaction module 204 of the application switching manager 202. The same may apply to application B, 212. Also here, a list may be exposed via a list interface 214 of application B to the application interaction module 204. Reference numerals 220 and 224 may denote an exposition of the lists of available actions related to the different applications 206, 212. Additionally, the application 206 and 212 may comprise action interfaces 210 and 216 that may be triggered from the application interaction module 204 depending on a user's choice. Commands going from the application interaction module 204 to the action interface 210, 216 may be denoted by reference numerals 222 and 226, respectively. Via the list interfaces 208, 214, possible action and/or commands being available within the applications 206, 212 may be transferred to the application interaction module 204. Once a user may switch between an active application 206 or 212 via the application switching manager 202, the application interaction module 204 may send a reference for an action or a command that has been exposed via the list interface 208, 214 before to the application interaction module 204 and which may have been selected by a user. This way, e.g., application A, 206 may have "informed" the application interaction module 204 about possible and available actions for application A, 206. A user may then select one of these actions. This action or command may then be transferred—via action interface 210—to application A, 206. It may immediately be executed when switching to application A, 206 without any additional user command or action required by a user. Thus, a selection of an active application, together with a command for the application, may be performed quasi synchronously and automatically, and in real-time. The same may be applicable for application B, 212.

Figure 3:
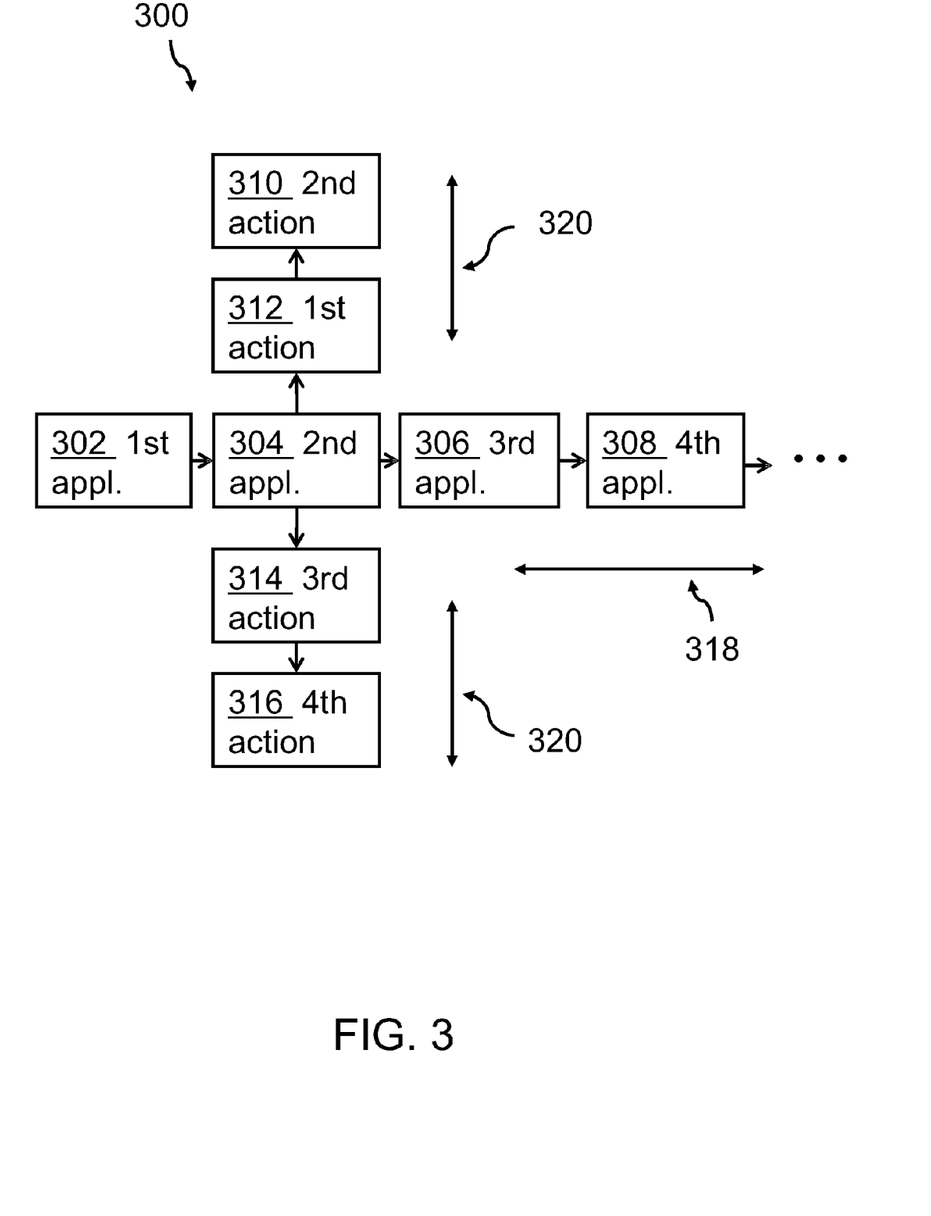
FIG. 3 shows a graphical representation of applications to be selected and functions to be selected for an active application.

FIG. 3 shows a graphical representation 300 of applications to be selected and action or commands to be selected for one active application.

Different applications 302, 304, 306, 308, and others may be displayed on a horizontal line, side by side, using icons for different applications. Such a displaying of different, selectable active applications, displayed as graphical icons, may be known from conventional technology. Arrow 318 may denote an application switching direction. In conventional user interfaces, this may be a horizontal direction. However, also a vertical application switching direction may be possible.

Arrow 320 may denote a different direction if compared to the application switching direction 318. If the application switching direction 318 may be oriented horizontally, in an application switching window of a graphical user interface, the "action traversing direction" 320 may have a different direction than the application switching direction 318. The action traversing direction 320 may, in particular, be vertically oriented within the application switching window. If, on the other hand, the application switching direction 318 may be oriented horizontally, the action traversing direction 320 may then be vertically oriented. However, the action traversing direction 320 may build any angle to the application switching direction 318.

In this embodiment, four possible actions may be recognizable, a first action 312, a second action 310, a third action 314, and a fourth action 316. Any number of actions related to the respective application 302, 304, 306, 308 may be possible. If no action may be displayed for a respective application, there may be no action available for a specific program or the program may not have been modified to support this new method for application switching. This may be the default case, if the respective application may not have been changed to comprise interfaces allowing an exchange of actions between the application program and an application switching manager.

It may be understood that in FIG. 3, the second application 304 may be highlighted if pre-selected because a user may intend to switch to this application. However, no action has been selected yet. By keeping, e.g., the Alt-TAB-key-combination for selecting an application according to the conventional method, up and down arrow keys may additionally be used for switching between the different possible actions for the respective selected application. A pre-selected action may be highlighted. By releasing the Alt-TAB-key-combination the active application together with the executed action or command may be selected.

It may alternatively also be possible to use—in parallel to the Alt-TAB-key-combination—a pointing device pointing to and selecting a specific action by hover a pointing indicator (cursor) over a selectable action of a specific application. This action may then be highlighted. It should be clear that for other operating systems—instead of using the Alt-TAB-key-combination—other key combinations may be used. It may be another key combination or a specific key on the keyboard, e.g., a function key that may perform the same function. It may also be possible to display all selectable applications by one command by one specific key and then selecting a specific application by hover a pointing device over a displayed icon for an active application.

However, it may be clear, that if another active application may be highlighted but not yet selected, another list of actions related to this to be activated application may be displayed together with an icon for the application. Thus, different lists of actions 310, 312, 314, 316 may be related to different selectable applications 302, 304, 306, 308.

It may also be possible to display all selectable applications with all potential actions simultaneously. A user may then have a complete overview of all actions for the respective active applications. He may also recognize which applications may have been modified in order to support this new method.

Figure 4:
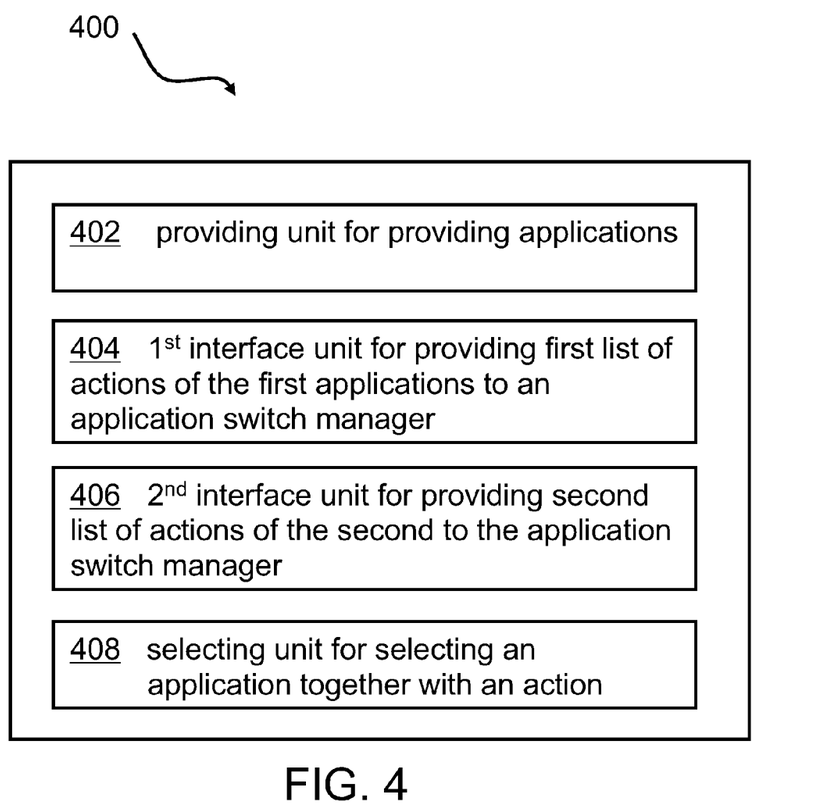
FIG. 4 shows a block diagram of an embodiment of the application switching unit.

FIG. 4 shows a block diagram of an embodiment of the application switching unit 400. The application switching unit 400 may comprise a providing unit 402 adapted for providing at least two active applications on the operating system. Furthermore, the application switching unit 400 may comprise a first interface unit 404 adapted for providing a first list of actions related to the first application to an application switching manager, and a second interface unit 406 adapted for providing a second list of actions related to the second active application to the application switching manager. Furthermore, the application switching unit 400 may comprise a selection unit 408 adapted for selecting an active application out of the at least two active applications together with selecting an action selected from the first list of actions for the first application or a second action from the second list of actions for the second application using a graphical user interface.

Such an application switching unit may also be comprised in a computer system. This way, the application switching unit of the computer system may work in cooperation with an operating system for performing the application switching method as described above.

Figure 5:
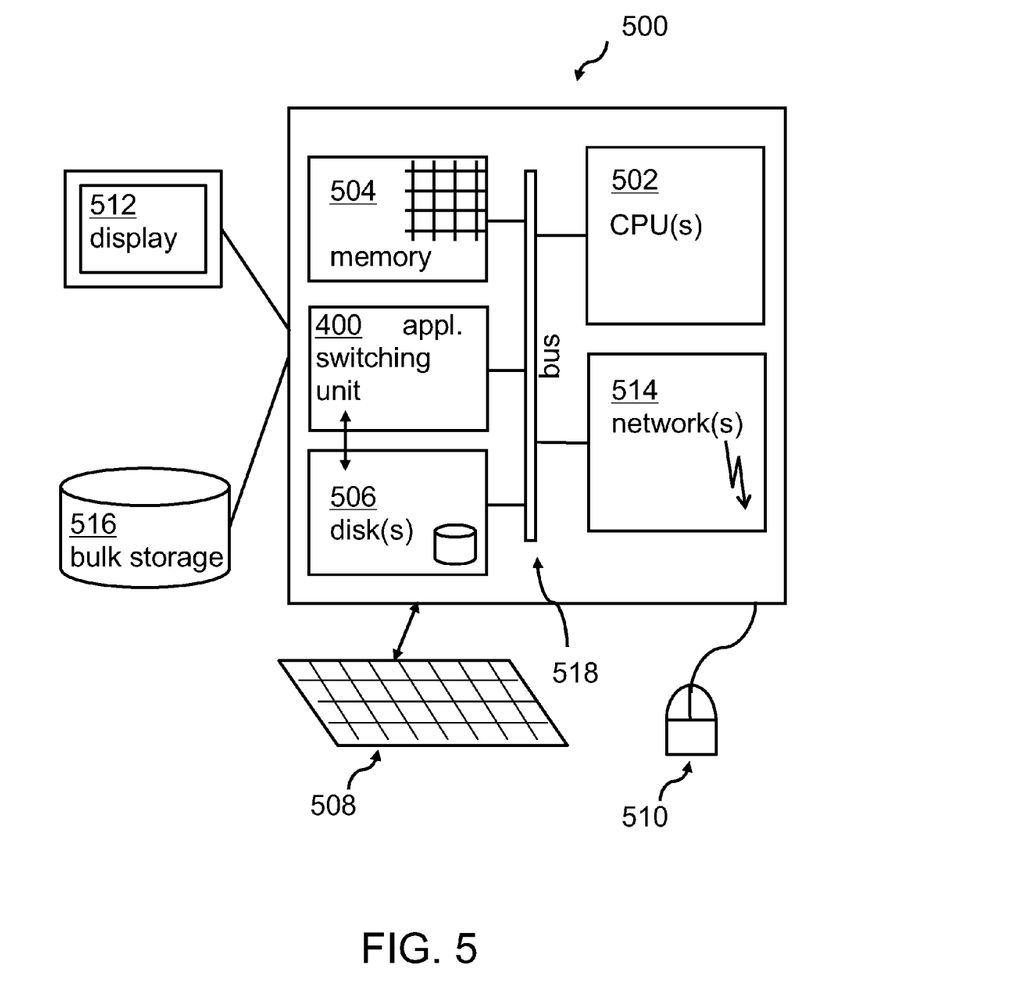
FIG. 5 displays a computer system including the inventive application switching unit.

Embodiments of the invention may be implemented on virtually any type of computer, regardless of the platform being suitable for storing and/or executing program code. For example, as shown in FIG. 5, a computer system 500 may include one or more processor(s) 502 with one or more cores per processor, associated memory elements 504, an internal storage device 506 (e.g., a hard disk, an optical drive such as a compact disk drive or digital video disk (DVD) drive, a flash memory stick, etc.), and numerous other elements and functionalities, typical of today's computers (not shown). The memory elements 504 may include a main memory, e.g., a random access memory (RAM), employed during actual execution of the program code, and a cache memory, which provides temporary storage of at least some program code and/or data in order to reduce the number of times, code and/or data must be retrieved from a long term storage medium or external bulk storage 516 for an execution. Elements inside the computer 500 may be linked together by means of a bus system 518 with corresponding adapters. Additionally, the application selection unit 400 may be attached to the bus system 518.

The computer system 500 may also include input means, such as a keyboard 508, a pointing device such as a mouse 510, or a microphone (not shown). Furthermore, the computer 500, may include output means, such as a monitor or screen 512 [e.g., a liquid crystal display (LCD), a plasma display, a light emitting diode display (LED), or cathode ray tube (CRT) monitor]. The computer system 500 may be connected to a network (e.g., a local area network (LAN), a wide area network (WAN), such as the Internet or any other similar type of network, including wireless networks via a network interface connection 514. This may allow a coupling to other computer systems or a storage network or a tape drive. Those, skilled in the art will appreciate that many different types of computer systems exist, and the aforementioned input and output means may take other forms. Generally speaking, the computer system 500 may include at least the minimal processing, input and/or output means, necessary to practice embodiments of the invention.

Further, those skilled in the art will appreciate that one or more elements of the aforementioned computer system 500 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

While the invention has been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. On the other side, the term "comprising" may also include the case of "consisting of". Also, elements described in association with different embodiments may be combined. It should also be noted that reference signs in the claims should not be construed as limiting elements.

The invention claimed is:

1. A method for application switching in an operating system, the method comprising:
   providing at least two active applications on the operating system;
   providing a first list of actions related to the first active application, via a first interface, to an application switching manager, and providing a second list of actions related to the second active application, via a second interface, to the application switching manager;
   selecting, using a graphical user interface, an active application out of the at least two active applications together with selecting an action selected from the first list of actions for the first application or a second action from the second list of actions for the second application, wherein selecting the active application comprises traversing graphically in an application switching direction through graphical representations of the at least two active applications based on a select application signal, and wherein selecting the action comprises traversing graphically through a graphical representation of the list of actions for an associated application of the at least two applications, wherein a respective action traversal direction is different to the application switching direction; and
   responsive to selecting the active application together with the action, (i) invoking the selected active application and (ii) invoking the selected action for the selected active application, wherein each action is associated with a command executable by the respective active application of the at least two applications, by executing the command immediately after selecting the active application in order to invoke the selected action for the selected active application, wherein each of the at least two active applications comprises an interface that is configured to provide to the operating system a list of actions associated with each respective active application, and wherein providing the first list of actions related to the first active application comprises the operating system querying the first active application to ascertain the first list of actions.

2. A computer system comprising a data processor, a memory, a storage device, and an application switching unit, the application switching unit comprising:
   a providing unit adapted for providing at least two active applications on the operating system, wherein each of the at least two active applications comprises an interface that is configured to provide a list of actions associated with each respective active application;
   a first interface unit adapted for providing a first list of actions related to the first application to an application switching manager, and a second interface unit adapted for providing a second list of actions related to the second active application to the application switching manager;
   a selection unit adapted for selecting, responsive to a graphical user interface, an active application out of the at least two active applications together with selecting an action selected from the first list of actions for the first application or a second action from the second list of actions for the second application, wherein selecting an active application comprises traversing graphically in an application switching direction through graphical representations of the at least two active applications based on a select application signal, and wherein selecting an action comprises traversing graphically through a graphical representation of the list of actions for an associated application of the at least two applications, wherein a respective action traversal direction is different to the application switching direction; and
   wherein the selection unit is further adapted for, responsive to selecting the active application together with the action, (i) invoking the selected active application, and (ii) invoking the selected action for the selected active application, wherein each action is associated with a command executable by the respective active application of the at least two applications, by executing the command immediately after selecting the active application in order to invoke the selected action for the selected active application, wherein each of the at least two active applications comprises an interface that is configured to provide to the operating system a list of actions associated with each respective active application, and wherein providing the first list of actions related to the first active application comprises the operating system querying the first active application to ascertain the first list of actions.

3. A computer program product comprising a non-transitory computer usable medium having stored thereon program code adapted for causing a computer to perform the method according to claim 1 when said program code is run on the computer.

* * * * *